US012799339B2

(12) United States Patent
Klein et al.

(10) Patent No.: US 12,799,339 B2
(45) Date of Patent: Nov. 17, 2026

(54) INTUMESCENT COATING HAVING IMPROVED LOW-TEMPERATURE FLEXIBILITY

(71) Applicant: Röhm GmbH, Darmstadt (DE)

(72) Inventors: Alexander Klein, Gau-Algesheim (DE); Janos Lotz, Gelnhausen (DE)

(73) Assignee: Röhm GmbH, Darmstadt (DE)

( * ) Notice: Subject to any disclaimer, the term of this patent is extended or adjusted under 35 U.S.C. 154(b) by 933 days.

(21) Appl. No.: 17/997,236

(22) PCT Filed: Apr. 15, 2021

(86) PCT No.: PCT/EP2021/059787
§ 371 (c)(1),
(2) Date: Oct. 26, 2022

(87) PCT Pub. No.: WO2021/219394
PCT Pub. Date: Nov. 4, 2021

(65) Prior Publication Data

US 2023/0174799 A1 Jun. 8, 2023

(30) Foreign Application Priority Data

Apr. 30, 2020 (EP) .................................... 20172245

(51) Int. Cl.
*C09D 5/18* (2006.01)
*C09D 4/06* (2006.01)
*C09D 7/63* (2018.01)
*C09D 175/16* (2006.01)

(52) U.S. Cl.
CPC ............... *C09D 5/185* (2013.01); *C09D 4/06* (2013.01); *C09D 7/63* (2018.01); *C09D 175/16* (2013.01)

(58) Field of Classification Search
None
See application file for complete search history.

(56) References Cited

U.S. PATENT DOCUMENTS 5,679,721 A * 10/1997 Courtoy .................. C09D 4/00 525/305
6,586,108 B1 * 7/2003 Courtoy ............... C09D 175/16 428/339
6,803,090 B2 * 10/2004 Castiglione ............ B64D 13/00 428/920
9,441,127 B2 * 9/2016 Suzuki ................. C09D 11/106
2004/0116545 A1 * 6/2004 Jakobstroer ........ C08G 18/4018 516/115
2004/0220340 A1 * 11/2004 McAlvin ............ C08G 18/8175 525/191
2008/0121851 A1 5/2008 Reinheimer
2008/0224105 A1 * 9/2008 Green .................. C09D 125/14 252/606
2010/0190886 A1 7/2010 Schmitt et al.
2010/0204396 A1 8/2010 Schmitt et al.
2011/0129680 A1 * 6/2011 Van Den Bergen ......................... B32B 17/10036 156/99
2015/0004402 A1 1/2015 Tarkin-Tas et al.
2018/0229480 A1 * 8/2018 Chung ..................... C08J 5/128

FOREIGN PATENT DOCUMENTS

| | | |
|---|---|---|
| CN | 105238222 | 11/2017 |
| DE | 102006056403 | 6/2008 |
| EP | 1833899 | 9/2007 |
| EP | 2154191 | 2/2010 |
| EP | 1636318 | 5/2011 |
| EP | 2171005 | 8/2018 |
| EP | 2171004 | 5/2019 |
| JP | 2006-523725 A | 10/2006 |
| KR | 10-2005-0091743 | 9/2005 |
| WO | 2004/056913 A1 | 7/2004 |
| WO | 2006/055377 | 5/2006 |
| WO | 2021/180488 | 9/2021 |

OTHER PUBLICATIONS

P.J. Longdon et al., "Development of alternative technologies for off-site applied intumescent coatings", European Commission Report, technical steel research, report EUR 21216, 2005, pp. 1-141.
International Search Report dated Jul. 16, 2021, in PCT/EP2021/059787, with English translation, 5 pages.
Written Opinion dated Jul. 16, 2021, in PCT/EP2021/059787, with English translation, 11 pages.

(Continued)

*Primary Examiner* — Joseph D Anthony
(74) *Attorney, Agent, or Firm* — Grüneberg Global IP, PLLC

(57) ABSTRACT

A novel reaction system can be used for intumescent coating. Intumescent coatings are used in particular for fire protection of metallic building components, such as girders in building construction. In the event of a fire, such coatings undergo reactive foaming that results in the formation on the metal girder of a fireproof insulating layer having low thermal conductivity and, through the insulation that this creates, retards any early, thermal-induced failure of the building component. Resin systems having improved low-temperature flexibility can be used to ensure good metal adhesion and impact resistance even at low temperatures, while avoiding the polymer components that are otherwise customary in resin systems.

18 Claims, No Drawings

(56) References Cited

OTHER PUBLICATIONS

Song Bo, "Plastic Modification Technology", China Textile & Apparel Press, 1st edition, 1st printing, Oct. 2016, 51 pages with English translation.
Zhiyu et al., "Intumescent Flame Retardant Technology and Application", Harbin Institute of Technology Press, 1st edition, 1st printing, Feb. 2005, 23 pages with English translation.

* cited by examiner

INTUMESCENT COATING HAVING IMPROVED LOW-TEMPERATURE FLEXIBILITY

CROSS-REFERENCE TO RELATED APPLICATIONS

This application is the National Stage entry under § 371 of International Application No. PCT/EP2021/059787, filed on Apr. 15, 2021, and which claims the benefit of priority to European Application No. 20172245.1, filed on Apr. 30, 2020. The content of each of these applications is hereby incorporated by reference in its entirety.

BACKGROUND OF THE INVENTION

Field of the Invention

The present invention relates to a novel reaction system for intumescent coating. Intumescent coatings are used in particular for fire protection of metallic building components, such as girders in building construction. In the event of a fire, such coatings undergo reactive foaming that results in the formation on the metal girder of a fireproof insulating layer having low thermal conductivity and that—through the insulation that this creates—retards any early, thermal-induced failure of said building component.

The present invention relates in particular to resin systems having improved low-temperature flexibility that ensure good metal adhesion and impact resistance even at low temperatures while avoiding the polymer components that are otherwise customary in resin systems.

Description of Related Art

A first generation of intumescent coating systems was based on high-molecular-weight thermoplastic resins based on (meth)acrylates and/or vinyl monomers and needed a high content of solvent or water for application to metal surfaces. Because of the high solvent content, with aqueous systems also having been described, these systems require correspondingly long drying times.

It is customary for intumescent coatings to be applied on site during the construction phase. Off-site application prior to delivery to the construction site would however be preferable, since this can take place under controlled conditions. However, slow drying means an uneconomical, inefficient processing time. The long processing times are of particular importance here, since the resin must be applied from different sides one after the other and each side dried in order to obtain a complete coating.

Epoxy-based intumescent coatings are used mainly in the off-shore industry. They have the characteristic feature of good ageing resistance and relatively short drying times. Polyurethane systems have also been intensively investigated. They likewise have the characteristic feature of a relatively short drying time and good water resistance. However, the results of fire tests were unsatisfactory, since the coating has poor adhesion to steel. Details thereof can be found in Development of alternative technologies for off-site applied intumescent, Longdon, P. J., European Commission, [Report] EUR (2005), EUR 21216, 1-141.

A further generation of intumescent coatings is based on (meth)acrylate reactive resins. The application thereof has the great advantage that no solvent is required here; once applied, the resin does however cure relatively rapidly. This gives rise not only to more swift processing, but also to a lower content of residual volatile constituents in the applied coating. Such intumescent coating systems were disclosed for the first time in EP 1 636 318.

A further improvement in the (meth)acrylate-based systems was disclosed for example in EP 2 171 004. This has the characteristic feature of a particularly high content of acid groups to improve metal adhesion.

EP 2 171 005 discloses a further development of a system of this kind. This has the particular characteristic feature of copolymerization of diacids or copolymerizable acids having a spacer group. This can additionally improve metal adhesion.

All of these systems are however in need of further improvement. For example, there is very little freedom as regards formulation options. Also, only relatively thick layers can be applied. The combined effect of these disadvantages means also, for example, that the foam height in the event of need or fire can be preset only to a minimal extent.

In addition, disadvantages can also arise from the relatively complex production process of the resins. What all otherwise very advantageous (meth)acrylate systems described in the prior art have in common is that the solid thermoplastic polymer present in the resin is here produced only separately, then dissolved in the monomer components and preformulated with additives before finally undergoing final formulation shortly before application as a 2 C system. This process chain is relatively complicated and there is great interest in making it simpler.

The European patent application having filing reference number 20162308.9 discloses resin systems produced by means of a novel process. In this process, a monomer mixture is polymerized to a maximum degree of polymerization of 70%. The glass transition temperature of the methacrylate-based polymeric component formed thereby is −20° C. to 23° C. and is thus significantly lower than that described in the abovementioned prior art. Despite this, the low-temperature flexibility of these systems remains limited, especially when using exclusively (meth)acrylate polymer components.

SUMMARY OF THE INVENTION

The object of the present invention was, with regard to the prior art, to provide a reactive resin system that is particularly flexible at low temperatures for the production of (meth)acrylate-based intumescent coatings that have improved impact resistance and can be applied off-site.

There was a need here for a simplified production process for a reactive resin system for intumescent coatings in which, by comparison with the prior art, the introduction of a solid (meth)acrylate polymer component, which is energetically costly, can be dispensed with.

A further object was to provide a novel formulation for a 2 C intumescent coating that, in addition to very good metal adhesion and easy processibility, additionally permits freedom as regards additivation and the adjustment of subsequent foaming control, particularly as regards the presetting of subsequent foam heights and foam quality, for example a particularly high fraction of closed-pore foam.

Further objects that are not mentioned explicitly may become apparent hereinbelow from the description or the examples, or from the overall context of the invention.

ACHIEVEMENT OF OBJECTS

These objects are achieved by a novel intumescent formulation and a reactive resin system for such intumescent formulations and by the coatings produced therewith. In particular, the invention relates to liquid, foamable intumescent formulation that comprise a resin system, said resin system being characterized in that it comprises at least one first polymer having an average molecular weight $M_n$ of between 1500 and 35 000 g/mol and a glass transition temperature of less than 15° C., at least one vinylic monomer, and at least one component that acts as a blowing agent at a temperature of above 200° C. A coating produced from said intumescent formulations is curable by polymerization. In addition, the intumescent formulations of the invention is characterized in that, prior to initiation of said polymerization, this comprises no component having an acid function and at the same time a molecular weight of greater than 1500 g/mol.

DETAILED DESCRIPTION OF THE INVENTION

This first polymer preferably has a functionality that is copolymerizable with vinylic monomers. By means of this functionality, the polymer chain is, during curing of the reactive resin, incorporated into the vinylic polymer chain formed during the polymerization. The first polymer may here also contain more than one of said copolymerizable vinylic functionalities per chain. The chains here preferably contain more than 2, particularly preferably more than 2.1, and especially preferably more than 2.3, of said functionalities per chain. The greater the proportion of said functionalities per chain, the higher the degree of crosslinking in the cured intumescent coating, which, if a high degree of crosslinking is present, increases the hardness in particular. The brittleness of the coating can also increase as the degree of crosslinking rises, but this can be countered by a suitable choice of polymers and of monomers in particular.

The first polymer is particularly preferably a liquid urethane (meth)acrylate, a liquid epoxy (meth)acrylate, a liquid polyether (meth)acrylate, a liquid polyester (meth)acrylate or mixtures thereof. It is particularly preferably a liquid urethane (meth)acrylate. A commercially available example of a urethane acrylate produced from polyols, isocyanates, and hydroxy-functional acrylates is EBECRYL 230 from Allnex.

It is possible to use commercial liquid polymers and mixtures thereof with (meth)acrylate-based reactive diluents, for example methyl methacrylate.

Alternatively, the liquid polymers can be prepared for example by reacting isocyanates with hydroxyalkyl (meth) acrylates and macromolecular polyols in a first step, for example in a stirred-tank reactor, before further components of the reactive resin are in a second step mixed in. This approach can be described as an in-situ process.

The term "liquid polymer" is in accordance with the invention understood as meaning a polymer having an average molecular weight $M_n$ of between 1000 and 35 000 g/mol, preferably between 1500 and 20 000 g/mol, more preferably between 1500 and 10 000 g/mol. In addition, this liquid polymer has a glass transition temperature of less than 15° C., preferably less than 10° C., more preferably less than 0° C.

Liquid polymer does not in this context necessarily mean thin or even free-flowing. Rather, it is preferable that this first polymer present in the reactive resin of the intumescent formulation has a dynamic viscosity at room temperature of 23° C., determined in accordance with DIN EN ISO 2555 using a rotational viscometer (Brookfield DV2T), of less than 250 000 mPa·s, preferably less than 100 000 mPa·s.

In accordance with the invention, when selecting the liquid polymers care must be taken to ensure they impart sufficient low-temperature flexibility to the reactive resin system. Particular preference is therefore given to using urethane (meth)acrylates. The liquid polymers should therefore have a glass transaction temperature (Tg) of from −80° C. to 15° C., preferably from −70° C. to 0° C., and more preferably from −60° C. to −20° C. It is preferable that the liquid polymer has an average of two or more (meth)acrylate groups in one molecule. If the number of groups is less than 2, the coating would have poor physical mechanical properties, but also solvent resistance and scratch resistance.

The vinylic monomers in the resin system are in turn preferably a (meth)acrylate and/or a mixture of different (meth)acrylates and/or monomers copolymerizable with (meth)acrylates, Examples of such copolymerizable monomers are styrene, itaconic acid or maleic acid.

The vinylic monomers are particularly preferably (methyl) methacrylate, (ethyl) methacrylate, n-butyl (meth) acrylate, isobutyl (meth)acrylate, t-butyl (meth)acrylate, 2-ethylhexyl (meth)acrylate, styrene or a combination of one or more of said monomers.

The (meth)acrylate monomers may for example be, in particular, alkyl (meth)acrylates of straight-chain, branched or cycloaliphatic alcohols having 1 to 40 carbon atoms, for example methyl (meth)acrylate, ethyl (meth)acrylate, n-butyl (meth)acrylate, 2-ethylhexyl (meth)acrylate, stearyl (meth)acrylate, lauryl (meth)acrylate; aryl (meth)acrylates, for example benzyl (meth)acrylate; mono(meth)acrylates of ethers, polyethylene glycols, polypropylene glycols or mixtures thereof having 5 to 80 carbon atoms, such as tetrahydrofurfuryl (meth)acrylate, methoxy(m)ethoxyethyl (meth) acrylate, benzyloxymethyl (meth)acrylate, 1-ethoxybutyl (meth)acrylate, 1-ethoxyethyl (meth)acrylate, ethoxymethyl (meth)acrylate, polyethylene glycol) methyl ether (meth) acrylate, and poly(propylene glycol) methyl ether (meth) acrylate. Suitable as constituents of monomer mixtures are also additional monomers having a further functional group, such as esters of acrylic acid or methacrylic acid with dihydric alcohols, for example hydroxyethyl (meth)acrylate or hydroxypropyl (meth)acrylate, acrylamide or methacrylamide, or dimethylaminoethyl (meth)acrylate. Examples of further suitable constituents of monomer mixtures are glycidyl (meth)acrylate or silyl-functional (meth)acrylates.

Adhesion promoters that are very preferably present in the intumescent composition are silane-functional (meth)acrylates such as 3-methacryloxypropyltrimethoxysilane, silane-functional vinyl compounds such as vinyltrimethoxysilane or preferably acid-functional monomers such as acrylic acid, methacrylic acid, 2-methacryloyloxyethyl phosphate, bis(2-methacryloxyoxyethyl) phosphate, 2-acryloyloxyethyl phosphate, bis(2-acryloyloxyethyl) phosphate, 2-methacryloyloxethyl maleate, acryloyloxethyl maleate, itaconic acid and/or 2-carboxyethyl acrylate, particularly preferably 2-carboxyethyl acrylate. Other examples, depending on the composition, include maleic acid, for which the presence of styrene in the monomer mixture is absolutely essential for the copolymerization, Preference is given to using from 0.2% by weight to 10% by weight, more preferably from 0.4% by weight to 4% by weight, of adhesion promoter in the resin composition.

In addition, combinations of two or more of these adhesion promoters are also possible.

Methyl methacrylate is, on account of its ability to produce low-viscosity solutions, the particularly preferred methacrylic acid ester. However, its high volatility and characteristic odor can mean that alternative (meth)acrylic acid esters may be preferable for certain uses.

The intumescent formulation preferably contains between 20% and 60% by weight of the resin system. Likewise preferably, said resin system in the intumescent formulation contains between 5% and 65% by weight, preferably between 20% and 55% by weight, of the first liquid polymer and/or between 30% and 90% by weight, preferably between 40% and 75% by weight, of vinylic monomers.

Irrespective of the composition of the reactive resin, the intumescent formulation preferably contains between 35% and 60% by weight, more preferably between 40% and 50% by weight, of blowing agent.

For the blowing agents, there are various alternatives. In a particularly preferred alternative, polyphosphates may be used, which at 190 to 300° C. are converted into phosphoric acid. The formulation additionally includes pentaerythritol, which above 300° C. in the presence of the phosphoric acid then forms a carbon foam with the elimination of water and carbon dioxide. In this process, water and carbon dioxide act as blowing agents. An additional advantage of this alternative is that both the polyphosphates and the phosphoric acid act as additional flame retardants.

A second alternative uses melamine, which above 350° C. decomposes to ammonia, nitrogen and carbon dioxide, with all three of these acting as blowing agents. A combination of these two alternatives makes it possible to additionally achieve further benefits besides a flame retardant action. In this way, it is possible to fine-tune the degree of foaming. Moreover, foaming takes place gradually, which is in turn advantageous in respect of foam stability.

The reactive resin is produced in a simple manner by mixing the abovementioned liquid components, typically Ins stirred-tank reactors in a batch mixing process.

Exemplary formulations of the invention can be summarized as follows:

Such a formulation for 2 C intumescent coating may, at a point in time after mixing the 2 C system, contain 30% to 50% by weight of the reactive resin produced by the process of the invention, 35% to 60% by weight of a blowing agent, 0.1% to 2.5% by weight of a peroxide and/or azo initiator, preferably only peroxides such as for example benzoyl peroxide, optionally up to 2% by weight of an accelerator, optionally 4.9% to 15% by weight of additives and 5% to 30% by weight of fillers. Optionally, the formulation can include additional pigments.

The initiator system generally consists of one or more peroxides and/or azo initiators, preferably a peroxide, and of an accelerator, generally one or more tertiary amines, especially an aromatic tertiary amine. A particularly suitable example of such an initiator is dibenzoyl peroxide, which can be used for example also in the form of a safe, preformulated paste in which the auxiliaries contained in said paste, for example paraffins, do not in the employed concentrations interfere with the formulation. Examples of accelerators include in particular N,N-dialkyl para-toluidines, for example N,N-bis(2-hydroxypropyl)-para-toluidine or N,N-dimethyl-para-toluidine or N,N-dimethylaniline.

Besides the constituents mentioned, the intumescent compositions or the reactive resin contained therein may include further optional constituents.

An optional constituent of the reactive resin is monomeric crosslinkers. In particular, polyfunctional (meth)acrylates such as allyl (meth)acrylate. Particular preference is given to di- or tri(meth)acrylates such as butane-1,4-diol di(meth)acrylate, tetraethylene glycol di(meth)acrylate, triethylene glycol di(meth)acrylate or trimethylolpropane tri(meth)acrylate. These monomeric crosslinkers may be present alongside crosslinking liquid polymers as described above.

Additives that may be optionally present in the intumescent composition or already present in the reactive resin include in particular wetting agents, film formers, deaeration reagents and/or dispersing agents. Optional fillers may for example be silica, titanium dioxide, quartz or other, in particular thermally stable, inorganic compounds. Inorganic fillers such as carbonates that can undergo thermal decomposition may be used only to a more minor extent, in order to avoid uncontrolled additional foaming of the coating in the event of fire. A particularly preferred filler is titanium dioxide.

The accelerators optionally used for faster curing as cold plastic are usually tertiary aromatic amines.

Besides the novel intumescent formulation, a process for curing this liquid foaming intumescent formulation also forms part of the present invention.

In this process of the invention, an initiator or a component of an initiator system is added to the intumescent formulation and the formulation is applied to a substrate within 20 min and cured within a further 120 min after application.

In an alternative process of the invention, the curing coating composition is a 2 C system. Here, the two part-compositions of the 2 C system are mixed together, then applied to a substrate within 20 min and cured within a further 120 min after application.

The formulation of the actual coating composition in this second alternative can take place as follows: the reactive resin is formulated with the blowing agents, additives, optional fillers and further optional fillers. Such intermediate formulations are then split into two fractions that are for example equal in size. One of these fractions is then additionally mixed with the accelerator. These two fractions are subsequently storage-stable even for long periods.

Before the actual application, the accelerator-free fraction is then mixed with the initiator Of initiator mixture. After a long period of storage or transport, it may first be necessary to stir both fractions again, since fillers, for example, may have settled. After stirring in or otherwise mixing in the initiator, the two fractions of the 20 system are then mixed together. This starts the polymerization of the monomeric constituents of the reactive resin, this being the start of the so-called pot life within which the application to the substrate, for example to a steel girder, must take place. With modern application devices, the mixing of the two fractions of the 2 C system can also take place in a mixing chamber of an application nozzle immediately before pressure-indicated spraying. The pot life derives from a combination of nature and concentration of the initiator and accelerator, the monomer composition and external influencing factors, for example the ambient temperature. These factors can be easily estimated and adjusted by those skilled in the art. Working with pot lives of several minutes to several hours is generally customary; these can also exceed the 20-hour mark. Preference is however given to significantly shorter pot lives that match the preferred process times given above. Such a pot life would be, for example, between 3 and 30 min, with pot lives of less than 10 minutes possible with fully automated application using spray machines.

In one of the two alternatives of the process, it is preferable that the initiator, a component of the initiator system or a constituent in a component of a 2 C system is an organic peroxide. This organic peroxide is particularly preferably a diacyl peroxide, a ketone peroxide, a peroxyester, a dialkyl peroxide, a hydroperoxide such as cumene hydroperoxide, a peroxyketal or a combination thereof.

In addition, as already stated, the present invention provides a process for the intumescent coating of a metal surface. In this process, the above-described formulation for the 2 C intumescent coating is prepared, applied to the metal surface within 1 to 20 minutes and cured thereon at a temperature of between 0 and 30° C., preferably between 17 and 23° C., within a period of 120 min, preferably within 60 min. The preferred layer thickness of the unfoamed coating is 1 to 20 mm, preferably 2.5 to 7.5 mm. This would be formulated such that, in the event of a fire, the coating would preferably result in the foam having a layer thickness of 20 to 100 mm, preferably 30 to 50 mm.

The total loss of weight by evaporation in the intumescent formulation during mixing, application to the substrate, and curing is particularly preferably less than 5% by weight. This can be ensured by a correspondingly suitable formulation, especially with regard to the selection of the monomers in the reactive resin.

EXAMPLES

Example 1: Production According to the Invention of a Reactive Resin

DEGADUR MDP Membran SG is a methacrylate-based, accelerator-free reactive resin commercially available from Rohm GmbH that comprises urethane methacrylates for flexibility. DEGADUR MDP Membran SG does not contain any solid polymeric components.

To 970.0 g of DEGADUR MDP Membran SG was added 20.0 g of 2-carboxyethyl acrylate and 10.0 g of N,N-bis(2-hydroxypropyl)-para-toluidine and the mixture was stirred at 50° C. until completely dissolved. The reactive resin was then cooled to room temperature.

Example 2: Inventive Formulation 1 of an Intumescent Coating

Composition of Formulation 1 from Example 2

| | |
|---|---|
| Reactive resin from example 1 | 40.0% by weight |
| Titanium dioxide | 10.0% by weight |
| Ammonium polyphosphate | 30.0% by weight |
| Pentaerythritol | 8.5% by weight |
| Melamine | 11.0% by weight |
| Byk D410 | 0.5% by weight |

It is understood that the embodiment described above is exemplary only. Many modifications or variations are possible.

Comparative Example 1: Noninventive Formulation 2 of an Intumescent Coating

DEGALAN 1710 is a commercially available meth(acrylate)-based reactive resin produced by Rohm GmbH having a solid (glass transition temperature >50° C.) thermoplastic polymer component.

Composition of Formulation 2 from Example 3

| | |
|---|---|
| DEGALAN 1710 | 40.0% by weight |
| Titanium dioxide | 10.0% by weight |
| Ammonium polyphosphate | 30.0% by weight |
| Pentaerythritol | 8.5% by weight |
| Melamine | 11.0% by weight |
| Byk 0410 | 0.5% by weight |

Properties of the Intumescent Coatings

Determination of Pot Life and Curing Time:

Immediately before application, 1 part by weight of Perkadox GB50-X (50% dibenzoyl peroxide powder, Nouryon) was mixed into 99 parts by weight of each of the above example formulations. The formulations were then each applied in a layer thickness of 3000 μm to steel plates. The pot life and the maximum temperature during curing were additionally measured on a smaller portion of the sample. The pot life corresponds to the length of time after addition of the initiator during which the viscosity is still low enough for application of the coating to be possible.

| | Inventive example formulation i | Noninventive formulation 2 |
|---|---|---|
| Pot life | 10 min | 16 min |
| Time until maximum temperature | 14 min | 34 min |
| Maximum temperature | 84° C. | 70° C. |
| Time until tack-free curing | 19 min | 43 min |

Determination of Low-temperature Flexibility

Immediately before application, 1 part by weight of Perkadox GB50-X (50% dibenzoyl peroxide powder, Nouryon) was mixed into 99 parts by weight of each of the above example formulations. The formulations were then each applied in a layer thickness of 1000 μm to sheet steel with a thickness of 1 mm.

Once curing was complete, the plates were cooled to −20° C. and the coated steel sheets were at this temperature bent through 90° over a right-angled edge. The coating at the bending point was then examined for cracks and flaking.

| | Inventive example formulation 1 | Noninventive formulation 2 |
|---|---|---|
| Low-temperature flexibility of the coating at −20° C. | No flaking or cracks visible | The coating shows clear cracks and flaking. |

In the bending test at −20° C., example formulation 1 of the invention shows significantly improved low-temperature flexibility compared to noninventive formulation 2 of the prior art.

The invention claimed is:

1. A liquid, foamable intumescent formulation, comprising:

a resin system, wherein the resin system comprises at least one first polymer having an average molecular weight $M_n$ of between 1,000 and 35,000 g/mol and a glass transition temperature of less than 15° C., and at least one vinylic monomer, wherein the intumescent formulation further comprises at least one component that acts as a blowing agent at a temperature of above 200° C., wherein a coating produced from the intumescent formulation is curable by polymerization and, prior to initiation of said polymerization, comprises no component having an acid function and at the same time a molecular weight of greater than 1,500 g/mol, wherein the component that acts as a blowing agent is selected from the group consisting of (a) melamine, (b) a combination of polyphosphates which at 190 to 300° C. are converted into phosphoric acid and pentaerythritol, and (c) a combination thereof, and wherein the first polymer is a liquid urethane (meth) acrylate, a liquid epoxy (meth)acrylate, a liquid polyether (meth)acrylate, a liquid polyester (meth) acrylate, or a mixture thereof.

2. The intumescent formulation as claimed in claim 1, wherein the first polymer has a dynamic viscosity of less than 250,000 mPa·s and a functionality that is copolymerizable with vinylic monomers.

3. The intumescent formulation as claimed in claim 1, wherein the at least one vinylic monomer in the resin system is a (meth)acrylate and/or a mixture of different (meth) acrylates and/or monomers copolymerizable with (meth) acrylates.

4. The intumescent formulation as claimed in claim 3, wherein the at least one vinylic monomer is selected from the group consisting of (methyl) methacrylate, (ethyl) methacrylate, n-butyl (meth)acrylate, isobutyl (meth)acrylate, t-butyl (meth)acrylate, 2-ethylhexyl (meth)acrylate, styrene, and a combination of said monomers.

5. The intumescent formulation as claimed in claim 1, wherein the intumescent formulation contains between 20% by weight and 60% by weight of the resin system.

6. The intumescent formulation as claimed in claim 1, wherein the resin system contains between 5% and 65% by weight of the first polymer.

7. The intumescent formulation as claimed in claim 1, wherein the resin system contains between 30% and 90% by weight of the at least one vinylic monomer.

8. The intumescent formulation as claimed in claim 1, wherein the intumescent formulation contains between 35% by weight and 60% by weight of the at least one component that acts as a blowing agent.

9. A process for curing the liquid foaming intumescent formulation as claimed in claim 1, the process comprising:

adding an initiator to the intumescent formulation, to obtain a mixture;

applying the mixture to a substrate within 20 min, and curing the mixture within a further 120 min.

10. The process as claimed in claim 9, wherein the initiator comprises an organic peroxide.

11. The process as claimed in claim 10, wherein the organic peroxide is a diacyl peroxide, a ketone peroxide, a peroxyester, a dialkyl peroxide, a hydroperoxide, a peroxyketal, or a combination thereof.

12. The process as claimed in claim 9, wherein the intumescent formulation is cured in less than 60 minutes at a temperature of between 17° C. and 23° C.

13. The process as claimed in claim 12, wherein a total loss of weight by evaporation in the intumescent formulation during mixing, application to the substrate, and curing is less than 5% by weight.

14. The intumescent formulation as claimed in claim 1, wherein the first polymer is a liquid urethane (meth)acrylate.

15. The process as claimed in claim 11, wherein the hydroperoxide is cumene hydroperoxide.

16. The intumescent formulation as claimed in claim 1, wherein the intumescent formulation contains between 35% by weight and 60% by weight of the blowing agent and wherein the blowing agent comprises melamine.

17. The intumescent formulation as claimed in claim 1, wherein the intumescent formulation contains between 35% by weight and 60% by weight of the blowing agent and wherein the blowing agent comprises melamine and a polyphosphate.

18. The intumescent formulation as claimed in claim 1, wherein the blowing agent comprises a polyphosphate, pentaerythritol, and melamine.

* * * * *